(12) United States Patent
Yasuda et al.

(10) Patent No.: US 12,135,554 B2
(45) Date of Patent: Nov. 5, 2024

(54) METHOD FOR DETERMINING PASSABILTY, PASSABILITY DETERMINATION APPARATUS, AND MOVEMENT PATH GENERATION

(71) Applicant: NEC Corporation, Tokyo (JP)

(72) Inventors: Shinya Yasuda, Tokyo (JP); Taichi Kumagai, Tokyo (JP); Hiroshi Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 255 days.

(21) Appl. No.: 17/640,972

(22) PCT Filed: Sep. 16, 2020

(86) PCT No.: PCT/JP2020/035023
§ 371 (c)(1),
(2) Date: Mar. 7, 2022

(87) PCT Pub. No.: WO2021/065504
PCT Pub. Date: Aug. 4, 2021

(65) Prior Publication Data
US 2022/0342422 A1 Oct. 27, 2022

(30) Foreign Application Priority Data
Sep. 30, 2019 (JP) .................. 2019-179042

(51) Int. Cl.
*G05D 1/02* (2020.01)
*G05D 1/00* (2006.01)

(52) U.S. Cl.
CPC .................. *G05D 1/0214* (2013.01)

(58) Field of Classification Search
CPC .. G05D 1/0214; G05D 1/0246; G05D 1/0212; G08G 1/00
See application file for complete search history.

(56) References Cited

U.S. PATENT DOCUMENTS

| 6,141,617 A * | 10/2000 | Matsuda | .................. B62D 1/28 701/72 |
| 2005/0012603 A1* | 1/2005 | Ewerhart | ............... B60Q 9/006 340/435 |
| 2021/0278849 A1* | 9/2021 | Zhu | ...................... G05D 1/0212 |

FOREIGN PATENT DOCUMENTS

| JP | H09-230933 A | 9/1997 |
| JP | H10-143243 A | 5/1998 |

(Continued)

OTHER PUBLICATIONS

International Search Report for PCT Application No. PCT/JP2020/035023, mailed on Dec. 8, 2020.

(Continued)

*Primary Examiner* — Rodney A Butler

(57) ABSTRACT

In order to appropriately determine whether or not a moving body can pass through a passage in a target range for generating a movement path, a passability determination apparatus 100 includes: an obstacle detection section 153 configured to detect a passage obstacle obstructing passage of a moving body 50, based on image information obtained by imaging a target range for generating a movement path for the moving body 50; a determination section 155 configured to determine passability for the moving body through a passage area included in the target range, based on detection of the passage obstacle; and a transmission processing section 157 configured to send passability information related to the passability for the moving body 50, to a movement path generation apparatus 200 generating the movement path.

12 Claims, 17 Drawing Sheets

(56) References Cited

FOREIGN PATENT DOCUMENTS

| | | |
|---|---|---|
| JP | 2003-340765 A | 12/2003 |
| JP | 2004-150827 A | 5/2004 |
| JP | 2004-249389 A | 9/2004 |
| JP | 2008-140159 A | 6/2008 |

OTHER PUBLICATIONS

English translation of Written opinion for PCT Application No. PCT/JP2020/035023, mailed on Dec. 8, 2020.

\* cited by examiner

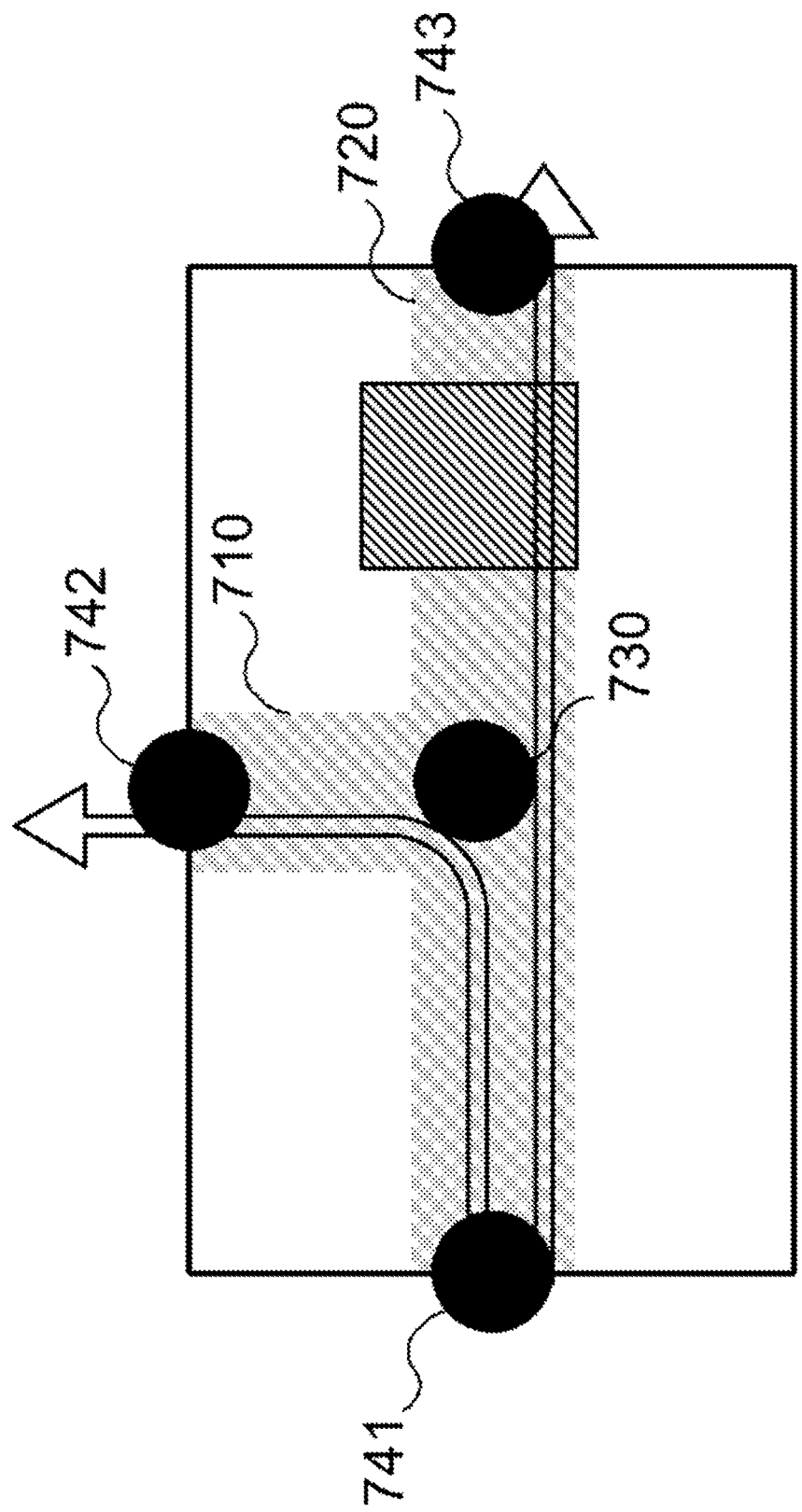

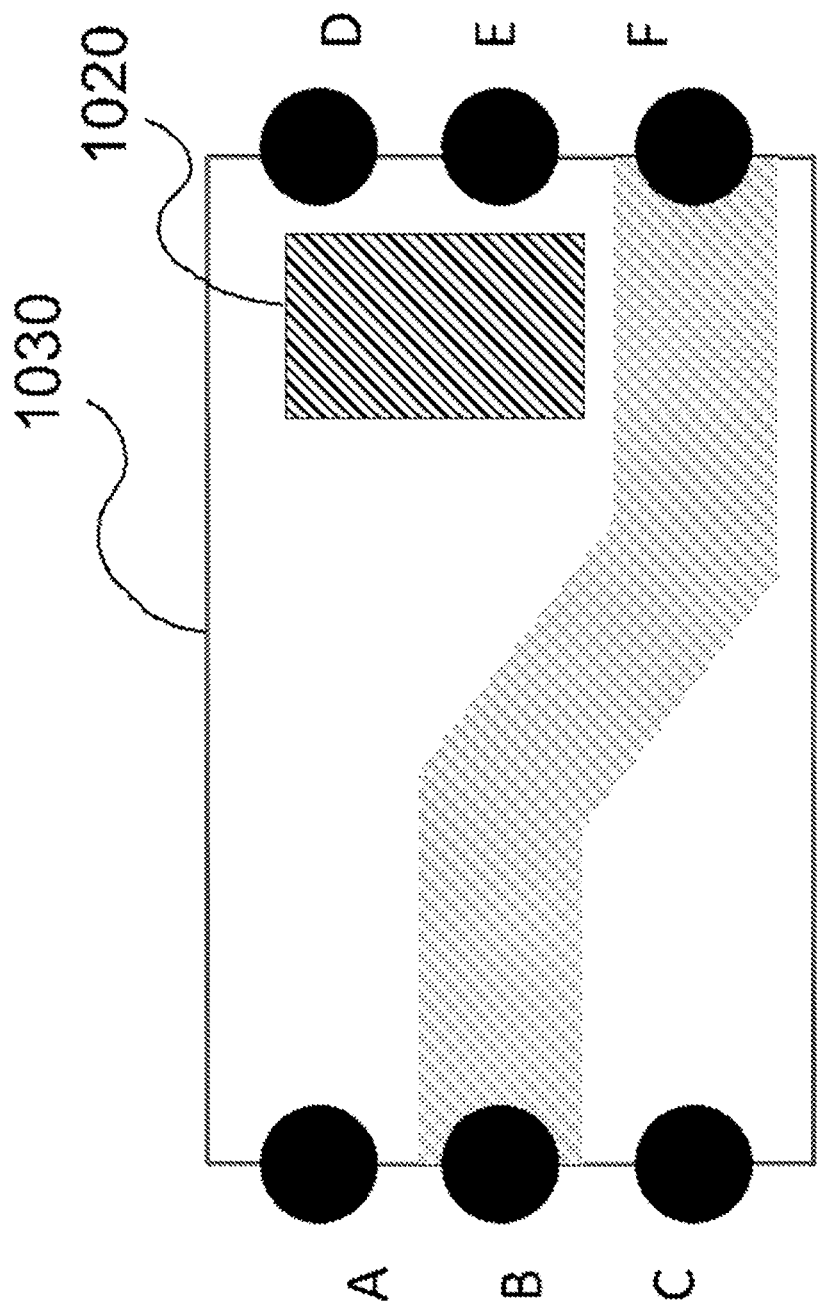

METHOD FOR DETERMINING PASSABILTY, PASSABILITY DETERMINATION APPARATUS, AND MOVEMENT PATH GENERATION

This application is a National Stage Entry of PCT/JP2020/035023 filed on Sep. 16, 2020, which claims priority from Japanese Patent Application 2019-179042 filed on Sep. 30, 2019, the contents of all of which are incorporated herein by reference, in their entirety.

BACKGROUND

Technical Field

The present invention relates to a method for determining passability, a passability determination apparatus, and a movement path generation system, for determining whether or not a moving body can pass through a passage.

Background Art

In a case of remotely controlling a moving body (e.g., a transport robot or the like) to perform operation such as transportation, it is necessary, for example, to determine a state of the moving body in an area where the moving body is movable and to generate a path through which the moving body moves based on the determination.

For example, by creating map information, based on a result of measuring size, such as a passage length, in a movement target range of the moving body and employing a technique, such as Dijkstra's method, using the map information, simple path generation is possible.

Here, looking at a case where the moving body moves along a path in actual, a passage indicated by static map information created in advance is not necessarily always usable. For example, in a site such as a logistics warehouse, it can be assumed that a load is temporarily placed in a passage and a plurality of moving bodies are present in the passage in a busy period. As described above, the state of the passage varies frequently, from time to time. For this reason, in a case where the moving body moves in an area in actual, it is necessary to sense the state of the passage in real time and change a moving path as needed.

For such a request, for example, PTL 1 discloses: preparing a model image as a background in advance; recognizing an object, based on the difference between an image captured by a camera and the model image; searching map information held in advance, based on a result of the recognition; and determining a movement path for transporting the object by a transport robot.

PTL 2 discloses, as a system for accurately determining whether or not it is possible to pass a narrow passage: checking the presence/absence of an obstacle in a path created by a robot, based on information from a sensor attached to a ceiling, a door, or the like; and determining whether a moving robot can pass in a laser line, based on a captured image.

Further, PTL 3 discloses: updating a traffic ban zone according to an operation input from a user to flexibly change a path to a target point according to an operation content; and detecting, by a robot, an obstacle to perform avoidance behavior.

CITATION LIST

Patent Literature

[PTL 1] JP 2004-249389 A
[PTL 2] JP 2003-340765 A
[PTL 3] JP 2008-140159 A

SUMMARY

Technical Problem

For example, in a site such as a logistics warehouse, it is assumed that a passable area frequently changes due to a temporary obstacle, a steam of people, and the like.

However, in the technique disclosed in PTL 1, a transport object is only recognized by using a captured image, and only the map information is used as an index for determining whether the robot can pass. In the techniques disclosed in PTLs 2 and 3, it is not possible to determine passability before the robot comes close to an obstacle.

An example object of the present invention is to provide a method for determining passability, a passability determination apparatus, and a movement path generation system with which it is possible to determine appropriately whether or not a moving body can pass through a passage in a target range for generating a movement path.

Solution to Problem

According to an aspect of the present invention, a method for determining passability includes: detecting a passage obstacle obstructing passage of a moving body, based on image information obtained by imaging a target range for generating a movement path for the moving body; determining passability for the moving body through a passage area included in the target range, based on detection of the passage obstacle; and sending passability information related to the passability for the moving body, to a movement path generation apparatus generating the movement path.

According to an aspect of the present invention, a passability determination apparatus includes: an obstacle detection section configured to detect a passage obstacle obstructing passage of a moving body, based on image information obtained by imaging a target range for generating a movement path for the moving body; a determination section configured to determine passability for the moving body through a passage area included in the target range, based on detection of the passage obstacle; and a transmission processing section configured to send passability information related to the passability for the moving body, to a movement path generation apparatus generating the movement path.

According to an aspect of the present invention, a movement path generation system includes: an obstacle detection section configured to detect a passage obstacle obstructing passage of a moving body, based on image information obtained by imaging a target range for generating a movement path for the moving body; a determination section configured to determine passability for the moving body through a passage area included in the target range, based on detection of the passage obstacle; and a movement path generation section configured to use passability information related to the passability for the moving body, to generate the movement path.

Advantageous Effects of Invention

According to an aspect of the present invention, it is possible to appropriately determine whether or not a moving body can pass through a passage in a target range for generating a movement path. Note that, according to the present invention, instead of or together with the above effects, other effects may be exerted.

BRIEF DESCRIPTION OF THE DRAWINGS

FIG. 7 is a diagram for describing a concrete example of determination of passability for a passage area including two passages;

FIG. 10B is a diagram for describing an example of the plurality of passages having movement directions positioned in the same path;

DESCRIPTION OF THE EXAMPLE EMBODIMENTS

Figure 1:
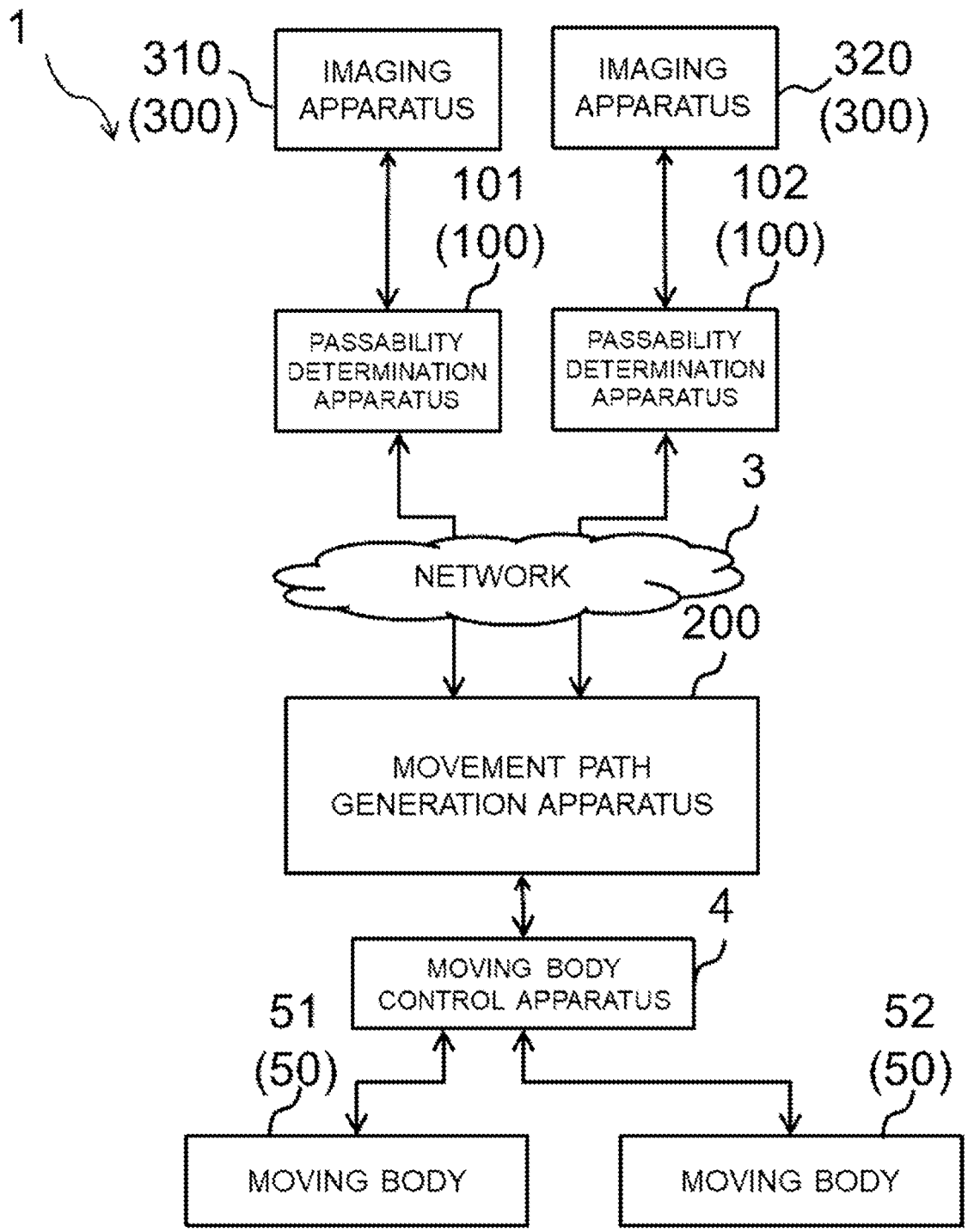
FIG. 1 is an explanatory diagram illustrating an example of a schematic configuration of a movement path generation system 1 according to example embodiments of the present invention.

Hereinafter, example embodiments of the present invention will be described in detail with reference to the accompanying drawings. Note that, in the Specification and drawings, elements to which similar descriptions are applicable are denoted by the same reference signs, and overlapping descriptions may hence be omitted.

Descriptions will be given in the following order.
1. Overview of Example Embodiments of the Present Invention
2. Configuration of System
3. First Example Embodiment
   3.1. Configuration of Passability Determination Apparatus 100
   3.2. Configuration of Movement Path Generation Apparatus 200
   3.3. Operation Example
   3.4. Example Alterations
4. Second Example Embodiment
   4.1. Configuration of Passability Determination Apparatus 100
   4.2. Operation Example
5. Other Example Embodiments 1. Overview of Example Embodiments of the Present Invention First, an overview of example embodiments of the present invention will be described.

(1) Technical Issues

In a case of remotely controlling a moving body (e.g., a transport robot or the like) to perform operation such as transportation, it is necessary, for example, to determine a state of the moving body in an area where the moving body is movable and to generate a path through which the moving body moves based on the determination.

For example, by creating map information, based on a result of measuring size, such as a passage length, in a movement target range of the moving body and employing a technique, such as Dijkstra's method, using the map information, simple path generation is possible.

Here, looking at a case where the moving body moves along a path in actual, a passage indicated by static map information created in advance is not necessarily always usable. For example, in a site such as a logistics warehouse, it can be assumed that a load is temporarily placed in a passage and a plurality of moving bodies are present in the passage in a busy period. As described above, the state of the passage varies frequently, from time to time. For this reason, in a case where the moving body moves in an area in actual, it is necessary to sense the state of the passage in real time and change a moving path as needed.

In view of these, a technique is conceivable in which a region measurement sensor capable of measuring a distance to a nearby substance is attached to a moving body, to detect a distance to such a substance in real time, and the moving body itself detects, while creating a map by the moving body, the position on the map.

In such a technique, a case is assumed where there is a difference between the time point at which an obstacle is placed in a passage in actual and the time point at which the moving body detects the obstacle. This happens because the sensor is attached to the moving body itself, which limits the range in which the moving body can detects a substance. For this reason, for example, when a passage obstacle is placed outside the detection area of the sensor attached to the moving body, the moving body cannot recognize the passage obstacle until the detectable range captures the passage obstacle.

Also conceivable is a method of installing one or more cameras at a position(s) where the camera(s) can look down upon a movement target range of a moving body, to determine in real time whether or not the moving body can pass through a passage. By knowing in advance at which position the passage appears in a camera image, detection of an obstacle is possible using a background difference method, for example.

However, gathering a number of camera images together into one place causes not only communication traffic to be enormous but also computational amount for image processing performed on the images (such as processing for detecting an obstacle) to be enormous. Hence, to realize real-time route planning, a broadband network facility and a high performance computing system that can handle enormous traffic are required, which leads to a problem of low practicability.

In view of these, an example object of the present example embodiments is to appropriately determine whether or not a moving body can pass through a passage in a target range for generating a movement path.

(2) Technical Features

In example embodiments of the present invention, for example, a passage obstacle obstructing passage of a moving body is detected based on image information obtained by imaging a target range for generating a movement path for the moving body, passability is determined for the moving body through a passage area included in the target range, based on detection of the passage obstacle, and passability information related to the passability for the moving body is sent to a movement path generation apparatus generating the movement path.

According to this, it is possible, for example, to appropriately determine whether or not a moving body can pass through a passage in a target range for generating a movement path. Note that the above-described technical features are concrete examples of the example embodiments of the present invention, and it is apparent that the example embodiments of the present invention are not limited to the above-described technical features.

2. Configuration of System

With reference to FIG. 1, an example of a configuration of a movement path generation system 1 according to the example embodiments of the present invention will be described. FIG. 1 is an explanatory diagram illustrating an example of a schematic configuration of the movement path generation system 1 according to the example embodiments of the present invention.

With reference to FIG. 1, the movement path generation system 1 includes two imaging apparatuses 310 and 320 (referred to simply as "imaging apparatus 300" unless differentiation is necessary), two passability determination apparatuses 101 and 102 (referred to simply as "passability determination apparatus 100" unless differentiation is necessary), a movement path generation apparatus 200, a network 3, a moving body control apparatus 4, and moving bodies 51 and 52 (referred to simply as "moving body 50" unless differentiation is necessary). Note that the movement path generation system 1 is not limited to a case of including two passability determination apparatuses 101 and 102 and may include one, or three or more passability determination apparatuses 100. The movement path generation system 1 is not limited to a case of including two moving bodies 50 and may include one, or three or more moving bodies 50.

In the movement path generation system 1 thus configured, the imaging apparatus 300 is, for example, a camera and is installed, for example, to a ceiling so as to include part or the whole of a range where the moving body is movable, in an imaging range. The imaging apparatus 300 sends a captured image to the passability determination apparatus 100. Note that the imaging apparatus 300 may be an imaging means capable of measuring the distance to a subject, based on the parallax of a twin-lens camera, such as a stereo camera including a twin-lens camera, for example.

Each of the passability determination apparatuses 101 and 102 determines passability for a passage by using image information obtained by imaging by a corresponding one of the imaging apparatuses 310 and 320 and sends information related to the result of the determination to the movement path generation apparatus 200 via the network 3.

The movement path generation apparatus 200 generates a movement path for the moving body 50, based on the information sent from the passability determination apparatus 100 and sends information indicating a movement path to the moving body control apparatus 4.

The moving body control apparatus 4 sends, to the moving body 50, control information for causing the moving body 50 to move along the movement path indicated by the movement path generation apparatus 200. The moving body 50 moves through the movement path in accordance with the control information sent from the moving body control apparatus 4.

3. First Example Embodiment

Next, a description will be given of a first example embodiment with reference to FIGS. 2 to 13.

3.1. Configuration of Passability Determination Apparatus 100

Figure 2:
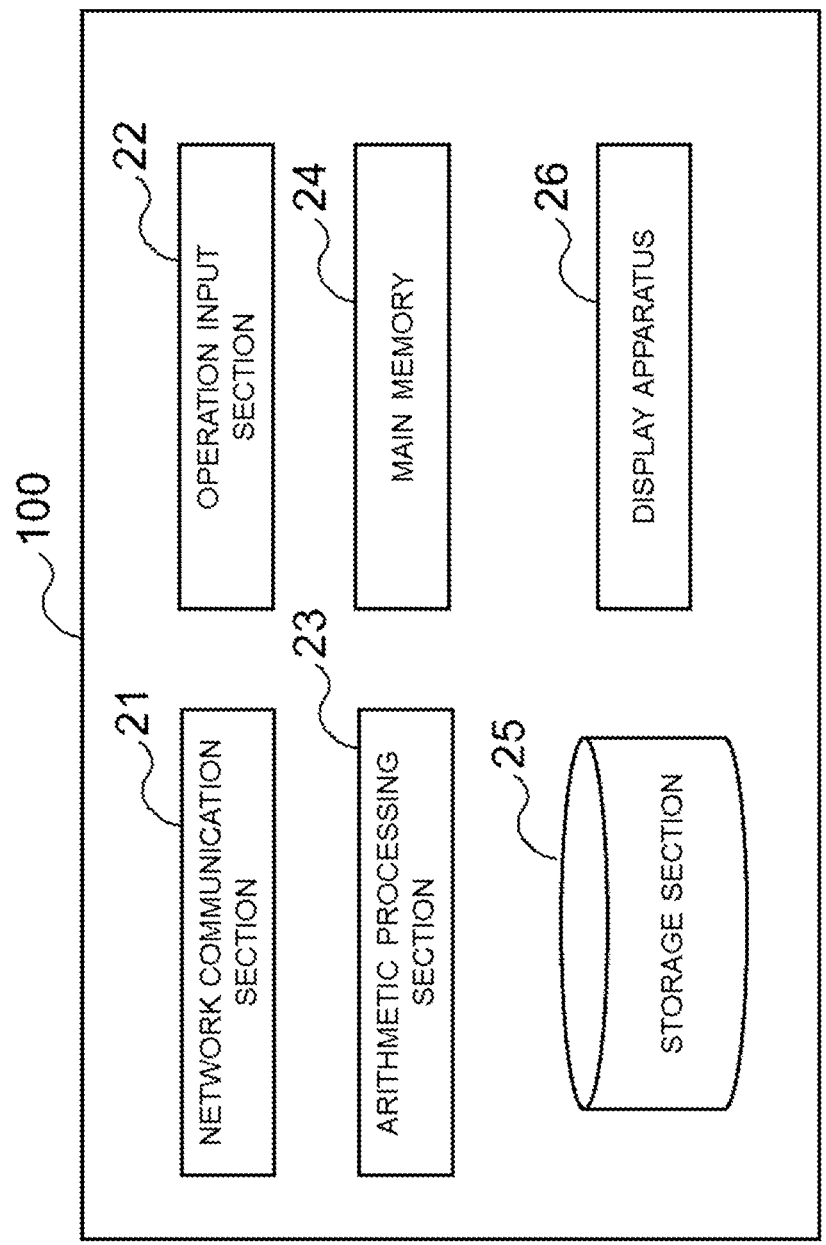
FIG. 2 is a block diagram illustrating an example of a hardware configuration of a passability determination apparatus 100 according to a first example embodiment.

FIG. 2 is a block diagram illustrating an example of a hardware configuration of a passability determination apparatus 100 according to the first example embodiment. With reference to FIG. 2, the passability determination apparatus 100 includes a network communication section 21, an operation input section 22, an arithmetic processing section 23, a main memory 24, a storage section 25, and a display apparatus 26.

The network communication section 21 receives a signal from a network and sends a signal to the network. Concretely, the network communication section 21 communicates with the movement path generation apparatus 200 via a network 3.

The operation input section 22 is an input interface that performs input processing for an operation request from a user managing the passability determination apparatus 100.

The arithmetic processing section 23 is, for example, a central processing unit (CPU), a graphics processing unit (GPU), or the like. The main memory 24 is, for example, a random access memory (RAM), a read only memory (ROM), or the like.

The storage section 25 is, for example, a hard disk drive (HDD), a solid state drive (SSD), a memory card, or the like. The storage section 25 may be a memory such as a RAM or a ROM. Concretely, the storage section 25 temporarily or permanently stores programs (instructions) and parameters for operations of the passability determination apparatus 100 as well as various data. Each of the programs includes one or more instructions for the operations of the passability determination apparatus 100.

Figure 3:
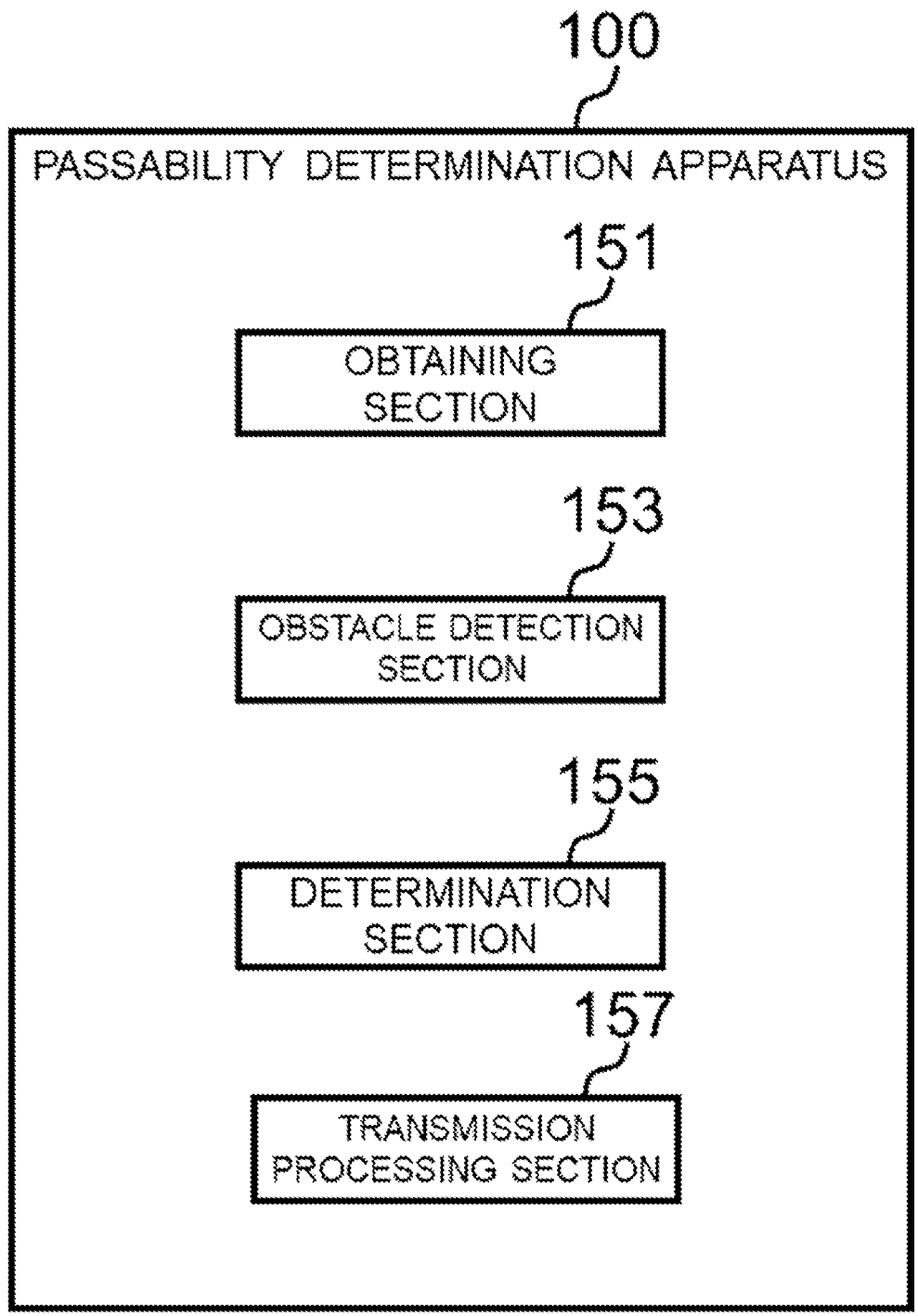
FIG. 3 is a block diagram illustrating an example of a functional configuration of the passability determination apparatus 100 according to the first example embodiment.

The passability determination apparatus 100, for example, reads programs for control stored in the storage section 25, to the main memory 24, and executes the programs by the arithmetic processing section 23, to thereby implement the functional sections as those illustrated in FIG. 3. The passability determination apparatus 100 may first read out programs to the main memory 24 for execution or may execute the programs without reading out the programs to the main memory 24. The main memory 24 and the storage section 25 also play roles in storing information and data held by the constituent elements included in the passability determination apparatus 100.

The above-described programs can be stored by using various types of non-transitory computer readable media to be provided to a computer. The non-transitory computer readable media include various types of tangible recording media (tangible storage media). Examples of the non-transitory computer readable media include magnetic recording medium (for example, a flexible disk, a magnetic tape, and a hard disk drive), a magneto-optical recording medium (for example, a magneto-optical disk), a compact disc-ROM (CD-ROM), a CD-recordable (CD-R), a CD-rewritable (CD-R/W), a semiconductor memory (for example, a mask ROM and a programmable ROM (PROM)), an erasable PROM (EPROM), and a flash ROM and RAM. The programs may be provided to a computer by various types of transitory computer readable media. Examples of the transitory computer readable media include an electric signal, an optical signal, and an electromagnetic wage. The transitory computer readable media can provide the programs to a computer through wired channels, such as electric wires and optical fibers, or wireless channels.

The display apparatus 26 is an apparatus, such as a liquid crystal display (LCD), a cathode ray tube (CRT) display, or a monitor, that displays a screen corresponding to drawing data subject to processing by the arithmetic processing section 23.

FIG. 3 is a block diagram illustrating an example of a functional configuration of the passability determination apparatus 100 according to the first example embodiment. With reference to FIG. 3, the passability determination apparatus 100 includes an obtaining section 151, an obstacle detection section 153, a determination section 155, and a transmission processing section 157. Note that the passability determination apparatus 100 may further include constituent elements other than these constituent elements.

3.2. Configuration of Movement Path Generation Apparatus 200

Figure 4:
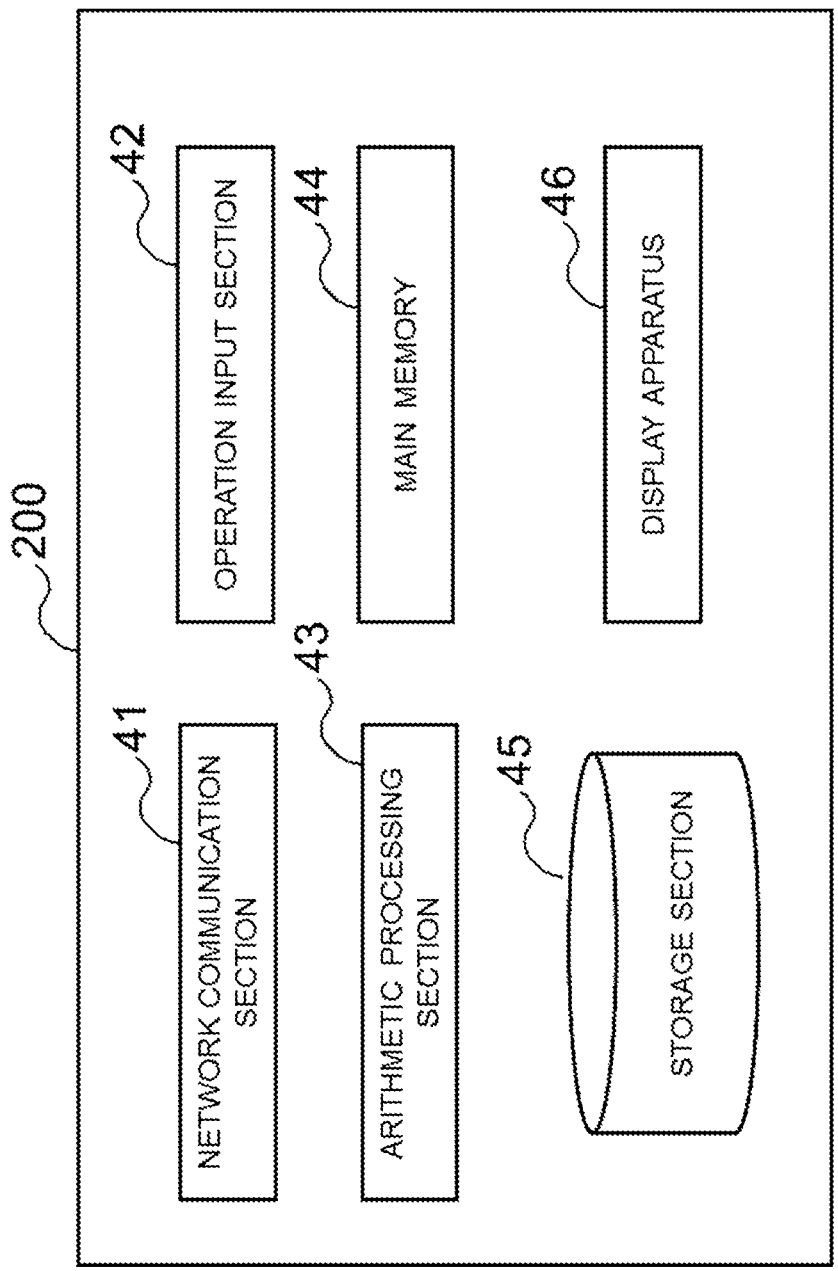
FIG. 4 is a block diagram illustrating an example of a hardware configuration of a movement path generation apparatus 200 according to the first example embodiment.

FIG. 4 is a block diagram illustrating an example of a hardware configuration of a movement path generation apparatus 200 according to the first example embodiment. With reference to FIG. 4, the movement path generation apparatus 200 includes a network communication section 41, an operation input section 42, an arithmetic processing section 43, a main memory 44, a storage section 45, and a display apparatus 46.

The network communication section 41 receives a signal from a network and sends a signal to the network. Concretely, the network communication section 41 communicates with the passability determination apparatus 100 via the network 3.

The operation input section 42 is an input interface that performs input processing for an operation request from a user managing the movement path generation apparatus 200.

The arithmetic processing section 43 is, for example, a central processing unit (CPU), a graphics processing unit (GPU), or the like. The main memory 44 is, for example, a random access memory (RAM), a read only memory (ROM), or the like.

The storage section 45 is, for example, a hard disk drive (HDD), a solid state drive (SSD), a memory card, or the like. The storage section 45 may be a memory such as a RAM or a ROM. Concretely, the storage section 45 temporarily or permanently stores programs (instructions) and parameters for operations of the movement path generation apparatus 200 as well as various data. Each of the programs includes one or more instructions for the operations of the movement path generation apparatus 200.

Figure 5:
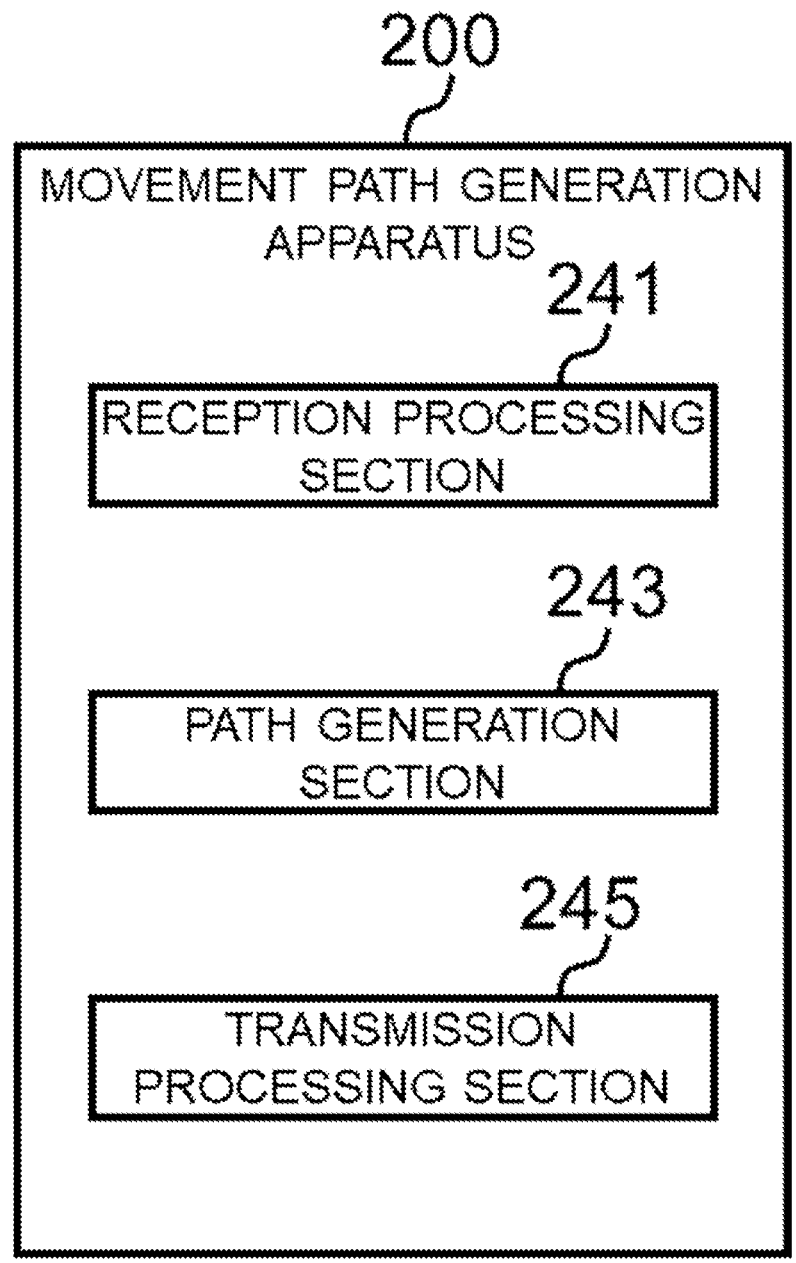
FIG. 5 is a block diagram illustrating an example of a functional configuration of the movement path generation apparatus 200 according to the first example embodiment.

The movement path generation apparatus 200, for example, reads programs for control stored in the storage section 45, to the main memory 44, and executes the programs by the arithmetic processing section 43, to thereby implement the functional sections as those illustrated in FIG. 5. The passability determination apparatus 100 may first read out programs to the main memory 44 for execution or may execute the programs without reading out the programs to the main memory 44. The main memory 44 and the storage section 45 also play roles in storing information and data held by the constituent elements included in the movement path generation apparatus 200.

The above-described programs can be stored by using various types of non-transitory computer readable media to be provided to a computer. The non-transitory computer readable media include various types of tangible recording media (tangible storage media). Examples of the non-transitory computer readable media include magnetic recording medium (for example, a flexible disk, a magnetic tape, and a hard disk drive), a magneto-optical recording medium (for example, a magneto-optical disk), a compact disc-ROM (CD-ROM), a CD-recordable (CD-R), a CD-rewritable (CD-R/W), a semiconductor memory (for example, a mask ROM and a programmable ROM (PROM)), an erasable PROM (EPROM), and a flash ROM and RAM. The programs may be provided to a computer by various types of transitory computer readable media. Examples of the transitory computer readable media include an electric signal, an optical signal, and an electromagnetic wage. The transitory computer readable media can provide the programs to a computer through wired channels, such as electric wires and optical fibers, or wireless channels.

The display apparatus 46 is an apparatus, such as a liquid crystal display (LCD), a cathode ray tube (CRT) display, or a monitor, that displays a screen corresponding to drawing data subject to processing by the arithmetic processing section 43.

FIG. 5 is a block diagram illustrating an example of a functional configuration of the movement path generation apparatus 200 according to the first example embodiment. With reference to FIG. 5, the movement path generation apparatus 200 includes a reception processing section 241, a path generation section 243, and a transmission processing section 245. Note that the movement path generation apparatus 200 may further include constituent elements other than these constituent elements.

3.3. Operation Example

Next, a description will be given of an operation example of the first example embodiment with reference to FIGS. 6A to 13.

First, according to the first example embodiment, the passability determination apparatus 100 (the obtaining section 151) obtains image information obtained by imaging a target range for generating a movement path of the moving body 50. The passability determination apparatus 100 (the obstacle detection section 153) uses the image information to detect a passage obstacle obstructing passage of the moving body 50. The passability determination apparatus 100 (the determination section 155) determines passability for the moving body 50 through a passage area included in the target range, based on detection of the passage obstacle. The passability determination apparatus 100 (the transmission processing section 157) sends passability information related to the passability for the moving body 50, to the movement path generation apparatus 200 generating a movement path.

According to the first example embodiment, the movement path generation apparatus 200 (the reception processing section 241) receives passability information sent from the passability determination apparatus 100. The movement path generation apparatus 200 (the path generation section 243) generates a movement path for the moving body 50 by using the passability information. The movement path generation apparatus 200 (the transmission processing section 245) sends path indication information indicating the movement path of the moving body 50, to the moving body control apparatus 4.

According to the first example embodiment, by determining passability for a moving body through a passage area, based on detection of a passage obstacle, it is possible to appropriately determine whether or not the moving body can pass through a passage existing in a target range.

(1) Detection of Passage Obstacle

As described above, the imaging apparatus 300 is installed to, for example, a ceiling so as to include part or the whole of a range where the moving body 50 is movable, in an imaging range. The imaging apparatus 300 continuously captures an image with a target range for generating a movement path as an imaging range. The obtaining section 151 then obtains, as the image information (video information), the captured images captured continuously by the imaging apparatus 300. The obtaining section 151 then sends the image information to the obstacle detection section 153.

The obstacle detection section 153 detects a substance (passage obstacle) included in the image information by using a background difference method, for example. Concretely, the obstacle detection section 153 calculates the difference in luminance value between a captured image in a state where no passage obstacle is placed and a captured image to be subject to a target for detecting a passage obstacle, and detects, based on the difference, the position (such as a coordinate position in the image) of the substance (passage obstacle) included in the image. The obstacle detection section 153 then sends information related to the position of the passage obstacle as obstacle position information to the determination section 155.

Note that detection of an obstacle is performed without being limited to the technique and may be performed, for example, by a technique as follows. Specifically, in a case where the imaging apparatus 300 is configured by a stereo camera or the like and hence can measure the distance to a subject, a passage obstacle may be detected as follows. In this case, for example, the obtaining section 151 obtains, as the image information, distance image information including distance information of the distance to the subject and sends the image information to the obstacle detection section 153. In a case where the obstacle detection section 153 finds out, based on the distance image information (the image information), that a substance is present at a position higher than a predetermined threshold from a floor surface in the imaging range of the imaging apparatus 300, the obstacle detection section 153 detects the substance as a passage obstacle.

(2) Determination of Passability

The determination section 155 configures in advance which image area of the imaging range (the target range for generating a movement path) to be the passage area, based on an operation input from the user of the passability determination apparatus 100, for example.

The determination section 155 then determines whether the moving body 50 can pass the passage area, based on the relationship between the position information of the passage obstacle detected by the obstacle detection section 153 and the position of the passage area.

Figure 6A:
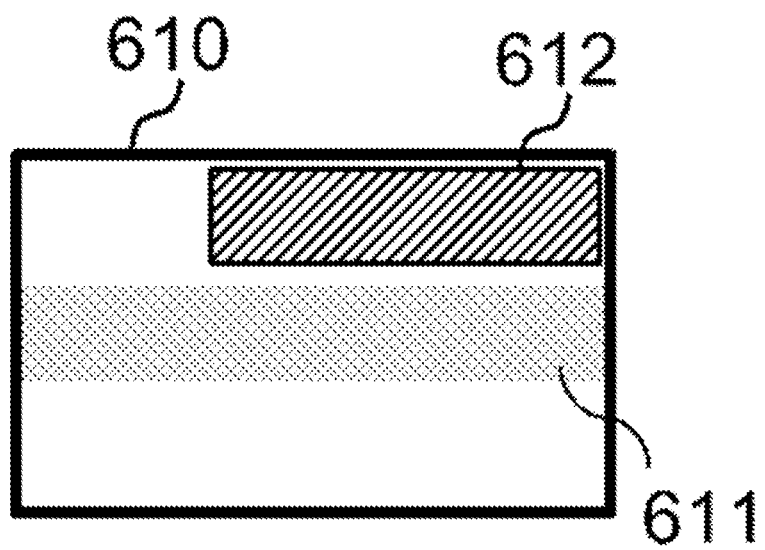
FIG. 6A is a diagram for describing a concrete example of determination of whether a moving body can pass a passage area.
Figure 6B:
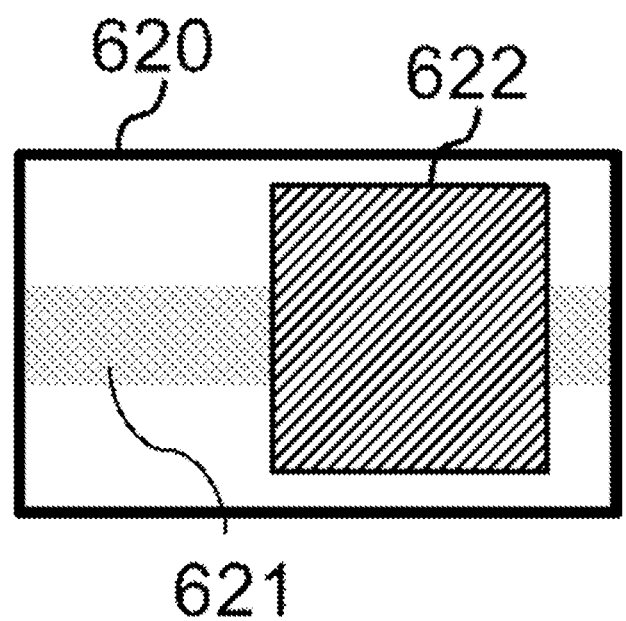
FIG. 6B is a diagram for describing a concrete example of the determination of whether a moving body can pass a passage area.

FIGS. 6A and 6B are diagrams for describing concrete examples of determination of whether a moving body can pass a passage area. For example, in image information 620 illustrated in FIG. 6B, a passage area 621 and a passage obstacle 622 overlap with each other, and hence the determination section 155 determines that the moving body 50 cannot pass through the passage area 621. In contrast, in image information 610 illustrated in FIG. 6A, a passage obstacle 612 is present but the passage obstacle 612 does not overlap with a passage area 611, and hence the determination section 155 determines that the moving body 50 can pass through the passage area 611.

Example of Plurality of Passages

In each of the examples illustrated in FIGS. 6A and 6B, a single passage exists in the passage area. However, the number of passages included in the passage area is not necessarily limited to one. In other words, a plurality of passages may be included in the passage area. In a case where a plurality of passages are included in the passage area as described above, the determination section 155 configures in advance a passage area including the plurality of passages in an imaging range, based on an operation input from the user of the passability determination apparatus 100, for example. The determination section 155 then determines passability for the moving body 50 through each of the plurality of passages, based on detection of a passage obstacle.

FIG. 7 is a diagram for describing a concrete example of determination of passability for a passage area including two passages. With reference to FIG. 7, two passages 710 and 720 are located in respective paths obtained by branching at a branch point 730. For simplifying the description, it is assumed that the passages 710 and 720 are each a one-way passage, and that entrance to each of the passages 710 and 720 is possible only from a left edge 741 of the imaging range. One passage 710 of the passages 710 and 720 runs along a path starting from the left edge 741 of the imaging range, turning upward at the branch point 730, and then exiting from an upper edge 742 of the imaging range. The other passage 720 runs along a path running straight from the left edge 741 of the imaging range to a right edge 743 of the imaging range.

In the example illustrated in FIG. 7, a passage obstacle is placed near the right edge 743 of the imaging range, the determination section 155 determines to be passable for the passage 710 and determines to be impassable for the passage 720.

(3) Sending of Passability Information

The transmission processing section 157 sends, as the passability information, information indicating the moving body 50 can pass through a passage included in the passage area, according to a result of the determination by the determination section 155. As described above, for example, in a case where a plurality of passages are included in the passage area, the transmission processing section 157 sends, as the passability information, information indicating passability for the moving body 50 for each of the plurality of passages.

Such passability information requires a small network resource compared with that required for data of a captured image. Hence, for example, with reference to FIG. 1, a number of passability determination apparatuses (the passability determination apparatuses 101 and 102) can send passability information to the movement path generation apparatus 200 simultaneously.

(4) Generation of Movement Path

Figure 8:
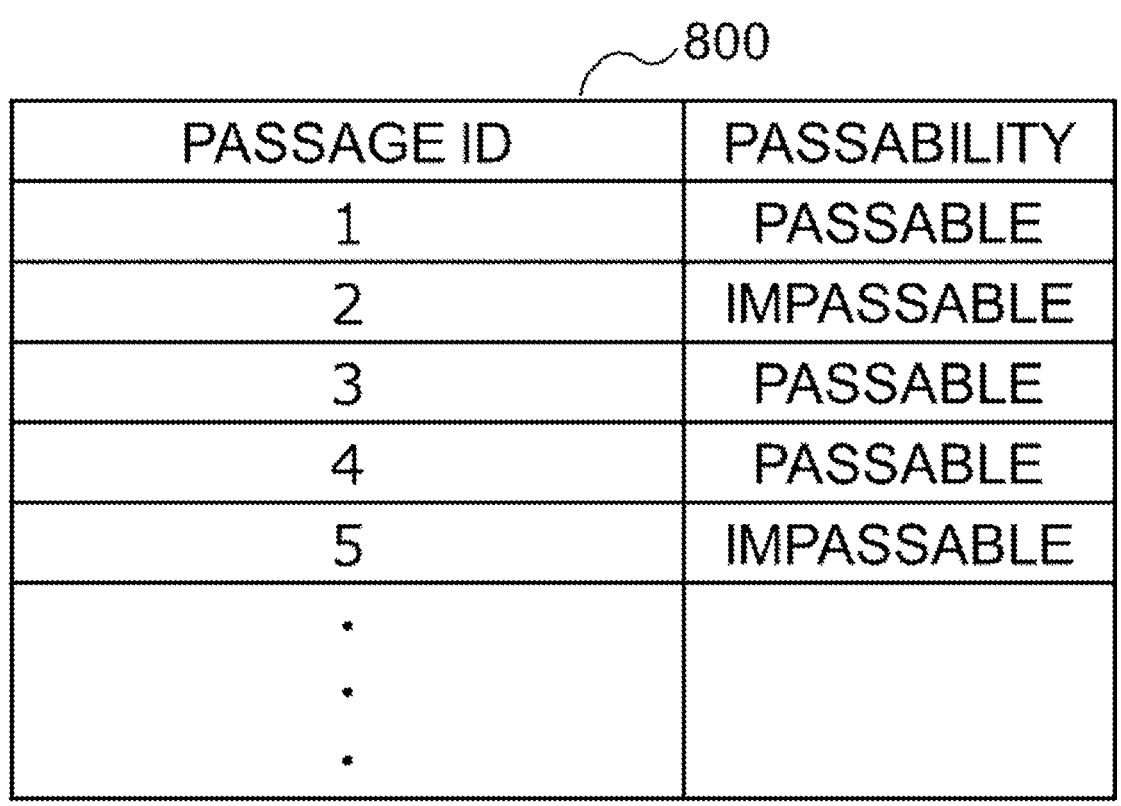
FIG. 8 is a diagram illustrating an example of a data table 800 in which passage IDs identifying respective passages and pieces of information indicating passability are associated with each other.

The movement path generation apparatus 200 (the path generation section 243) generates a movement path for the moving body 50, based on the passability information sent from the passability determination apparatus 100. For example, the movement path generation apparatus 200 (the path generation section 243) manages passability for the passage included in each piece of passability information sent from each of the passability determination apparatuses 100, as a data table 800 as that illustrated in FIG. 8. FIG. 8 is a diagram illustrating an example of the data table 800 in which passage IDs identifying respective passages and pieces of information indicating passability are associated with each other.

With reference to FIG. 8, the movement path generation apparatus 200 (the path generation section 243) identifies a passage ID and passability, based on passability information sent from the passability determination apparatus 100, and updates the contents of the data table 800, based on the identified information.

The starting point and the goal point of a movement path is configured, for example, based on indication information from the moving body control apparatus 4 or an operation input from the user of the movement path generation apparatus 200. The movement path generation apparatus 200 (the path generation section 243) then refers to the data table 800 to generate the movement path. First, the passage ID of a target passage connecting the starting point and the goal point is identified. Then, with reference to the passability information corresponding to the identified passage ID, a passable passage is identified. Then, in response to the movement path generation apparatus 200 selecting the passable passage, a movement path is generated.

Figure 9:
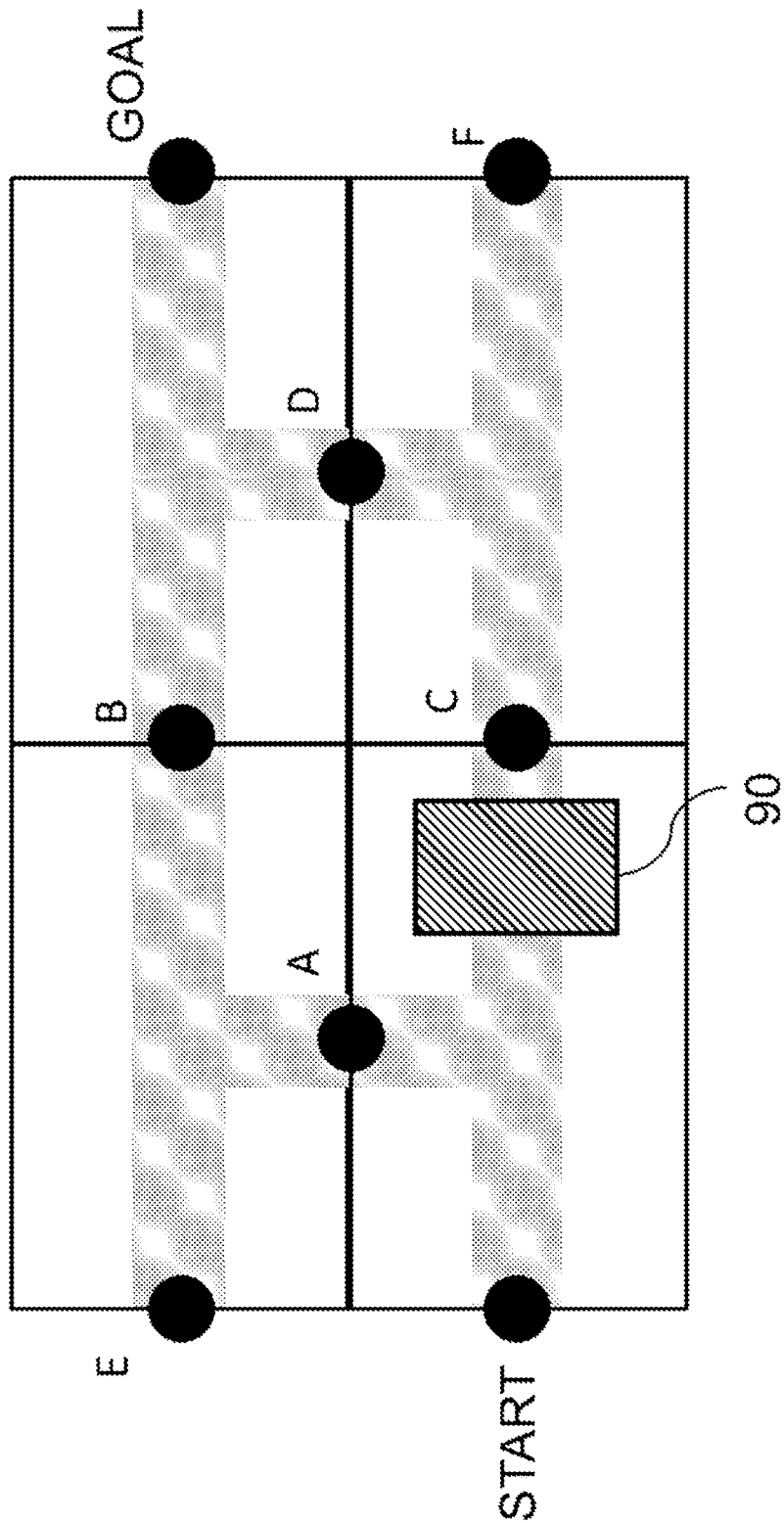
FIG. 9 is a diagram for describing a concrete example of generation of a movement path.

FIG. 9 is a diagram for describing a concrete example of generation of a movement path. First, in the example illustrated in FIG. 9, a movement start point of the moving body 50 is denoted by "START", and a movement target point is denoted by "GOAL". Points at which imaging ranges of the imaging apparatuses 300 switch are denoted by points A to F. In the example illustrated in FIG. 9, it is assumed that a passage exists between any two points to which symbols are assigned. In the example illustrated in FIG. 9, it is assumed that there is a possibility that a passage obstacle 90 is placed in the passage connecting "START" and the point C, which causes the passage to be impassable.

Under assumptions as those described above, in a case where the passage obstacle 90 is not placed, the shortest possible path from "START" to "GOAL" is calculated, for example, by Dijkstra's method, and results in "START→A→B→GOAL" or "START→C→D→GOAL". The path generation section 243 outputs, to the moving body control apparatus 4, an available shortest possible path from among the paths as the movement path of the moving body 50.

In contrast, in a case where the passage obstacle 90 is placed and the moving body 50 does not start to move, the moving body 50 cannot pass through the passage along "START→C". Hence, at the time of receiving passability information corresponding to detection of the passage obstacle 90, the path generation section 243 changes the movement path to the passage along "START→A→B→GOAL".

Note that the movement path generation apparatus 200 may change, after outputting a movement path to the moving body control apparatus 4, the movement path according to the passability information received from the passability determination apparatus 100. The movement path generation apparatus 200 may receive position information of the moving body 50 from the moving body control apparatus 4 and generate, with the point as a start, a path to a target point.

Since a sudden change in operation of the moving body 50 may cause a collision with a nearby moving body 50, the movement path generation apparatus 200 may impose restrictions such as prohibiting moving in the direction opposite to the current movement direction (in other words, turning back), as conditions for generating a movement path. With such restrictions, immediate regeneration of a movement path is possible even in a case where part of a path turns to be unavailable, for example, due to an obstacle being placed in a passage. For example, in the example illustrated in FIG. 9, assume that the passage obstacle 90 is placed. If it is immediately after start of the moving body 50, the movement path generation apparatus 200 may change the movement path to the "current location of the moving body→A→B→GOAL". In contrast, in a case where the current position of the moving body 50 is such that the moving body 50 has already passed the point C, the movement path generation apparatus 200 does not need to change the movement path and hence only needs to configure the movement path to be the "current location of the moving body→D→GOAL".

3.4. Example Alterations

The first example embodiment is not limited to the above-described operation example and can have various modifications.

(1) First Example Alteration

For example, in a case where a plurality of passages are included in a passage area, the passages may be located on respective paths having the same movement direction. In other words, a plurality of paths heading in the same direction may be prepared, and a plurality of lanes (passages) along the respective paths may be virtually prepared.

Figure 10A:
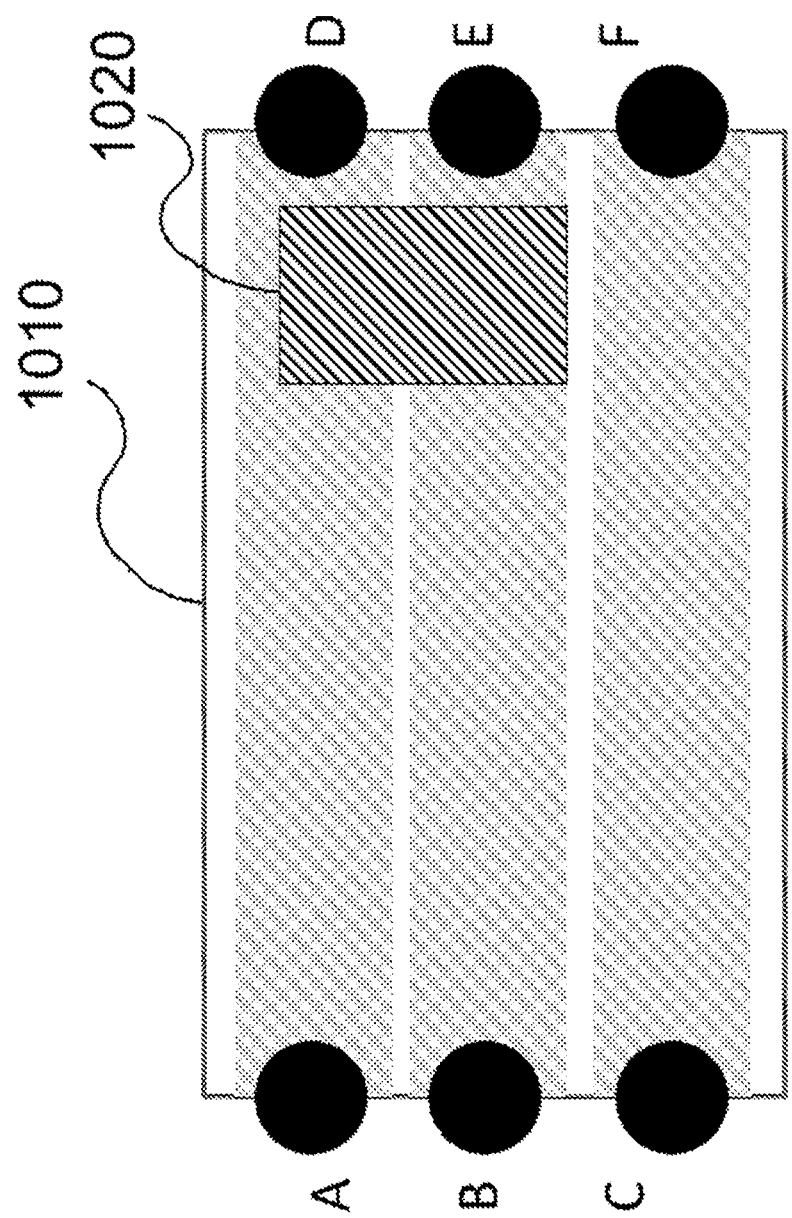
FIG. 10A is a diagram for describing an example of a plurality of passages having movement directions positioned in the same path.

FIGS. 10A and 10B are diagrams for describing examples of the plurality of passages having movement directions positioned in the same path. With reference to FIG. 10A, for example, there are three passages, i.e., a path "A→D", a path "B→E", and a path "C→F", heading from the left side toward the right side of a rectangular imaging range 1010. In such a case, as illustrated in FIG. 10A, for example, even when part of each of the passages along the path "A→D" and the path "B→E" is blocked by a passage obstacle 1020 and the passages result in being impassable, the passage along the path "C→F" is still passable. Hence, according to the example illustrated in FIG. 10A, it is possible to have redundancy for paths.

Moreover, each passage does not need to be parallel to a rectangular imaging range and may have virtual lane change. In this case, as illustrated in FIG. 10B, for example, a passage along a path "B→F", which is not parallel to an imaging range 1030, may be newly added. By considering such a passage, the movement path generation apparatus 200 can generate a path more flexibly.

Figure 11:
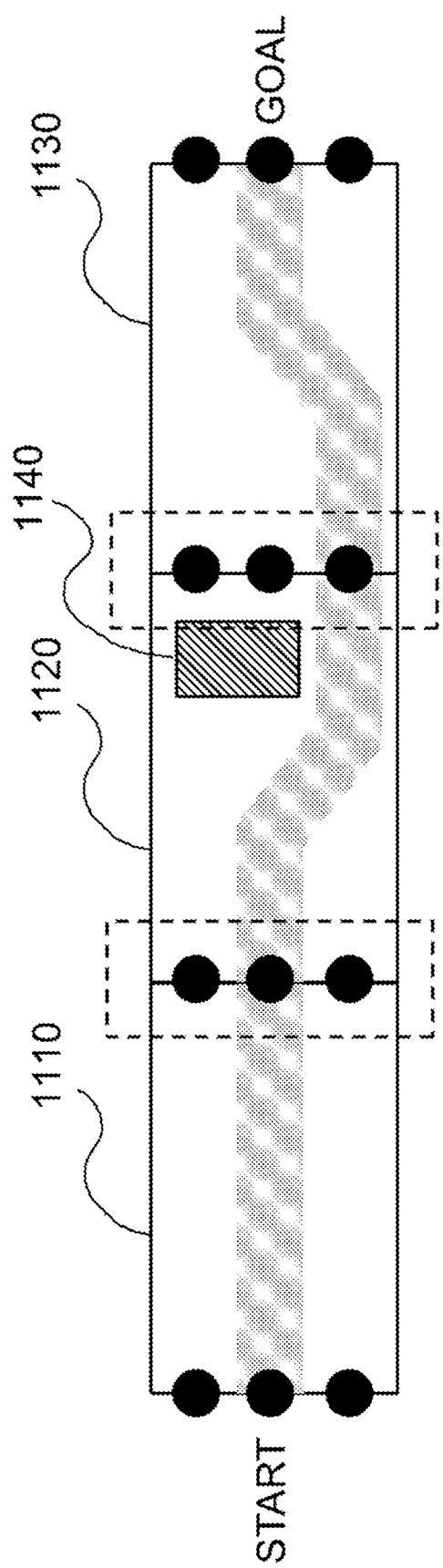
FIG. 11 is a diagram for describing a concrete example in which a moving body 50 moves a distance corresponding to three screens for imaging by three passability determination apparatuses 100.

FIG. 11 is a diagram for describing a concrete example in which the moving body 50 moves a distance corresponding to three screens for imaging by three passability determination apparatuses 100. Assume that a movement operation of the moving body 50 is performed from the left edge to the right edge. In this case, the left edge is configured as "START", and the right edge is configured as "GOAL". In the example illustrated in FIG. 11, it is assumed that "START" corresponds to a center point of the left edge of an imaging range 1110 of a left-most camera, and GOAL corresponds to the center point of the right edge of an imaging range 1130 of a right-most camera. In this case, for example, the path illustrated in FIG. 11 that is heading from the start point to the goal point and is not blocked by a passage obstacle 1140 present in an imaging range 1120 held between the imaging ranges 1110 and 1130 is obtained as a movement path for the moving body 50.

(2) Second Example Alteration

Figure 12:
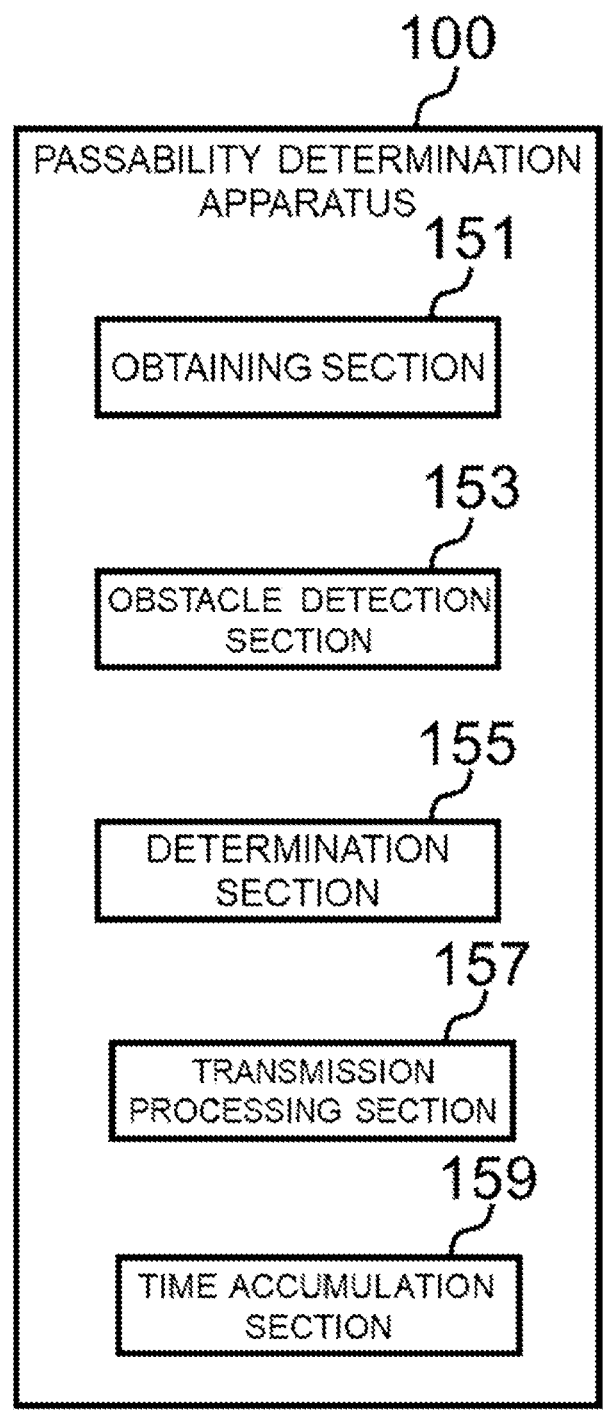
FIG. 12 is a block diagram illustrating an example of a functional configuration of a passability determination apparatus 100 according to a second example alteration.

The passability determination apparatus 100 may output, for each passage, a numeric value representing the cost required for passing through the passage, to the movement path generation apparatus 200. FIG. 12 is a block diagram illustrating an example of a functional configuration of a passability determination apparatus 100 according to a second example alteration. With reference to FIG. 12, the passability determination apparatus 100 includes a time accumulation section 159 in addition to the above-described configuration illustrated in FIG. 3. In the second example alteration, the movement path generation apparatus 200 combines paths selected to minimize the cost of the paths, to generate a movement path for the moving body 50. For example, Dijkstra's method is used for generation of such a movement path.

For example, accumulation of the number of times or the time period each of the passages has been impassable in a nearest certain time period is configured as the cost. In this case, it is possible for the movement path generation apparatus 200 to combine paths so that a passage(s) that has actually been impassable more is avoided as much as possible, to generate a movement path for the moving body 50.

To generate such a movement path, for example, the passability determination apparatus 100 (the time accumulation section 159) accumulates passable time period of a passage area, based on detection of a passage obstacle. The passability determination apparatus 100 (the transmission processing section 157) then sends information related to the accumulation of passable time period, to the movement path generation apparatus 200. Such information related to the accumulation of passable time period (passage cost) is used as an index value for evaluating the shortest possible movement path for the moving body 50.

Concretely, the time accumulation section 159 divides, for example, one day into some time periods, for example, a morning period where goods arrive, an evening period where goods are shipped, and a daytime period between the morning period and the evening period, and accumulates, for each time period and for each passage, in terms of the frequency and time period the passage is impassable. The transmission processing section 157 then outputs the result of the accumulation as the passage cost to the movement path generation apparatus 200. In this way, the movement path generation apparatus 200 can exclude, from candidates for the movement path, a passage(s) having a high possibility of being impassable for each time period.

Note that, as the passage cost, the length (distance) of each passage may be, for example, used without being limited to such accumulation of passable time period as that described above.

(3) Third Example Alteration

Figure 13:
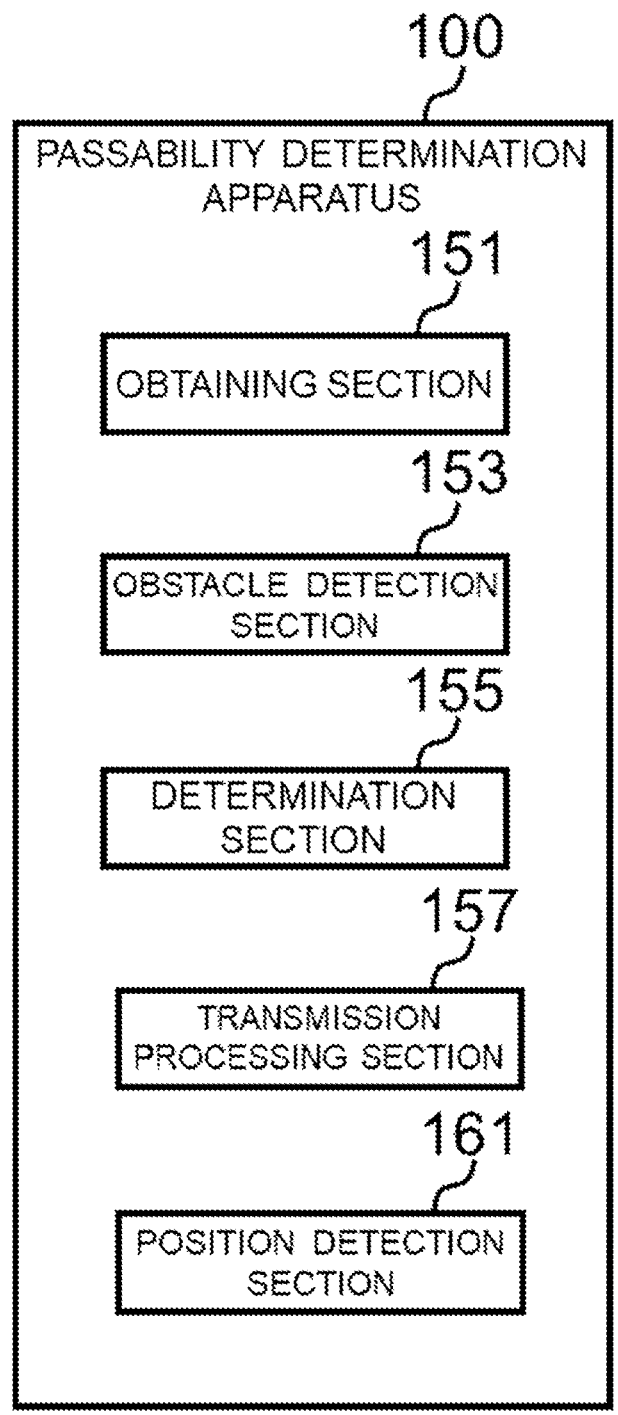
FIG. 13 is a block diagram illustrating an example of a functional configuration of a passability determination apparatus 100 according to a third example alteration.

The passability determination apparatus 100 may detect the position of the moving body 50. FIG. 13 is a block diagram illustrating an example of a functional configuration of a passability determination apparatus 100 according to a third example alteration. With reference to FIG. 13, a processing section 150 of the passability determination apparatus 100 includes a position detection section 161 in addition to the configuration illustrated in FIG. 3. Concretely, the position detection section 161 can detect the position of the moving body 50 by using an image captured by the imaging apparatus 300. For example, by referring to information in which coordinates in a captured image and coordinates in an actual space are associated with each other in advance, the position detection section 161 can detect the position of the moving body 50.

The passability determination apparatus 100 (the transmission processing section 157) then sends moving body position information related to the position of the moving body, to the movement path generation apparatus 200. In this way, the movement path generation apparatus 200 can generate a movement path appropriate for the current position of the moving body 50, based on the passability information and the moving body position information sent from the passability determination apparatus 100.

(4) Others

The imaging apparatus 300 is not limited to a case of having a fixed imaging range, but may, for example, image a plurality of imaging ranges in response to rotation operation of a camera or the like. Also in this case, by identifying which area of each imaging range is a passage area, the passability determination apparatus 100 (the determination section 155) can determine whether there is a passage obstacle in the passage area.

The obstacle detection section 153 and the determination section 155 are not limited to a case of being mounted in the same apparatus (the passability determination apparatus 100). For example, the obstacle detection section 153 and the determination section 155 may be mounted in separate apparatuses or systems. In this case, the apparatus including the obstacle detection section 153 may send a result of detection of an obstacle, to the apparatus including the determination section 155. The apparatus including the determination section 155 may then perform passability determination, based on the received result of the detection.

4. Second Example Embodiment

Next, a second example embodiment of the present invention will be described with reference to FIGS. 14 and 15. The above-described first example embodiment is a concrete example embodiment, whereas the second example embodiment is a more generalized example embodiment.

4.1. Configuration of Passability Determination Apparatus 100

Figure 14:
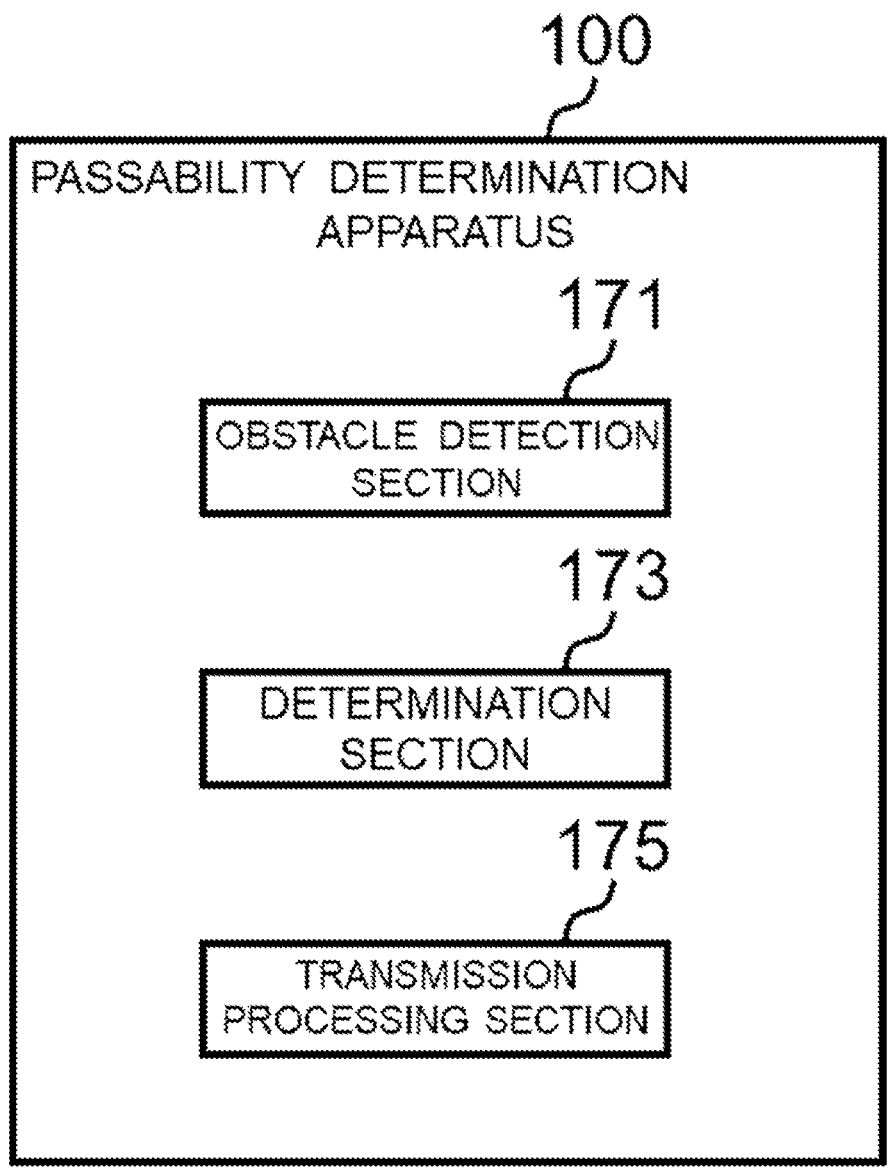
FIG. 14 is a block diagram illustrating an example of a schematic configuration of a passability determination apparatus 100 according to a second example embodiment.
Figure 15:
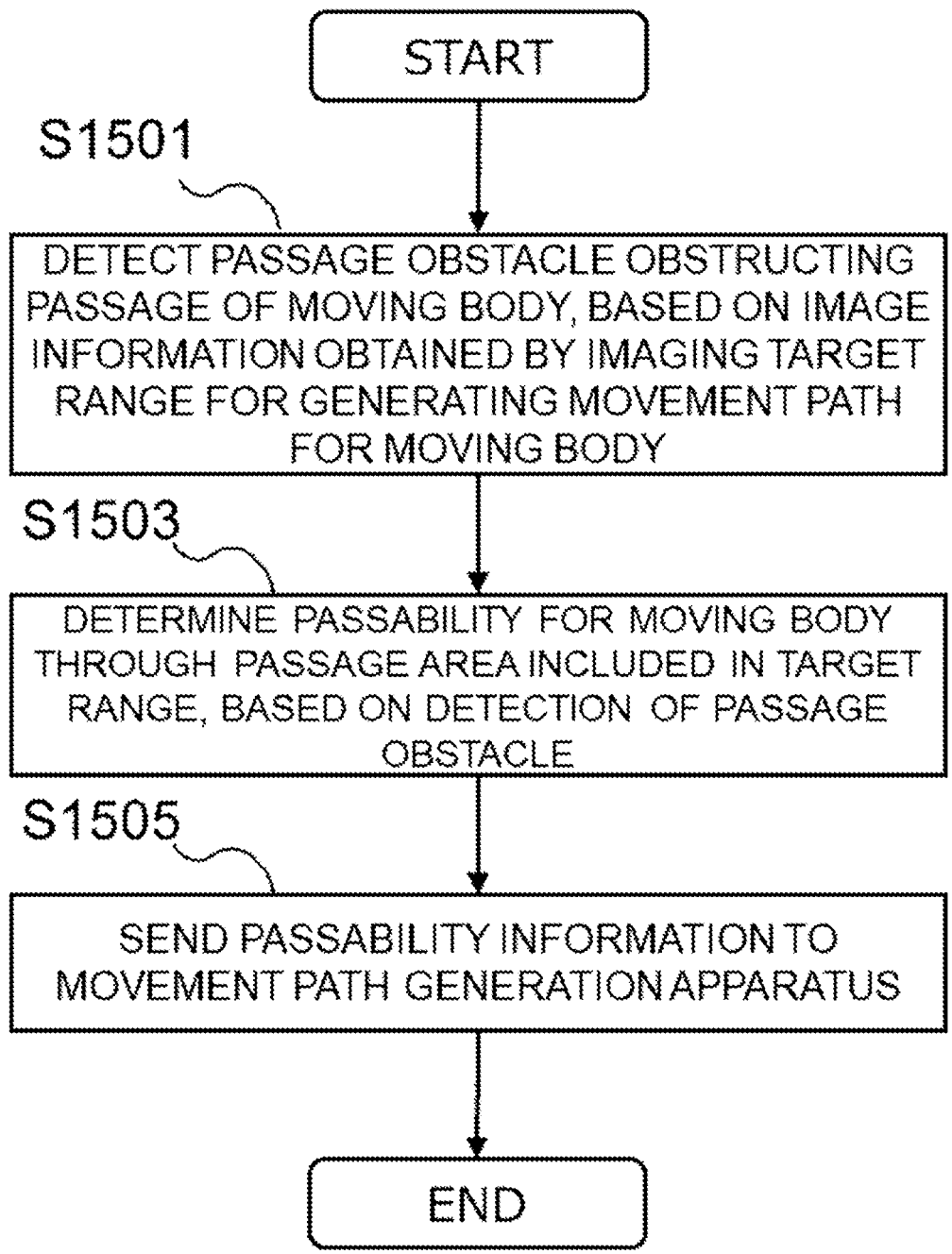
FIG. 15 is a diagram for describing a flow of processing performed by the passability determination apparatus 100 according to the second example embodiment.

FIG. 14 is a block diagram illustrating an example of a schematic configuration of a passability determination apparatus 100 according to a second example embodiment. With reference to FIG. 14, the passability determination apparatus 100 includes an obstacle detection section 171, a determination section 173, and a transmission processing section 175.

The obstacle detection section 171, the determination section 173, and the transmission processing section 175 may be implemented with one or more processors, a memory (for example, a nonvolatile memory and/or a volatile memory), and/or a hard disk. The obstacle detection section 171, the determination section 173, and the transmission processing section 175 may be implemented with the same processor or may be implemented with separate processors. The memory may be included in the one or more processors or may be provided outside the one or more processors.

4.2. Operation Example

An operation example according to the second example embodiment will be described. FIG. 15 is a diagram for describing a flow of processing performed by the passability determination apparatus 100 according to the second example embodiment.

According to the second example embodiment, the passability determination apparatus 100 (the obstacle detection section 171) detects a passage obstacle obstructing passage of the moving body 50, based on image information obtained by imaging a target range for generating a movement path of the moving body 50 (step S1501). The passability determination apparatus 100 (the determination section 173) determines passability for the moving body 50 through a passage area included in the target range, based on the detection of the passage obstacle (step S1503). The passability determination apparatus 100 (the transmission processing section 175) sends passability information related to the passability for the moving body 50, to the movement path generation apparatus 200 generating a movement path (step S1505).

Relationship with First Example Embodiment

As an example, the obstacle detection section 171, the determination section 173, and the transmission processing section 175 of the second example embodiment may perform respective operations of the obstacle detection section 153, the determination section 155, and the transmission processing section 157 of the first example embodiment. In this case, the descriptions of the first example embodiment may be applicable to the second example embodiment.

Note that the second example embodiment is not limited to this example.

The second example embodiment has been described above. According to the second example embodiment, for example, by determining passability for a moving body through a passage area, based on detection of a passage obstacle, it is possible to appropriately determine whether or not the moving body can pass through a passage existing in a target range.

5. Other Example Embodiments

Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

For example, the steps in the processing described in the Specification may not necessarily be executed in time series in the order described in the corresponding flowchart. For example, the steps in the processing may be executed in an order different from that described in the corresponding flowchart or may be executed in parallel. Some of the steps in the processing may be deleted, or more steps may be added to the processing.

An apparatus including constituent elements (e.g., the obtaining section, the obstacle detection section, the determination section, and/or the transmission processing section) of the passability determination apparatus described in the Specification (e.g., one or more apparatuses (or units) among a plurality of apparatuses (or units) constituting the passability determination apparatus or a module for one of the plurality of apparatuses (or units)) may be provided. Moreover, methods including processing of the constituent elements may be provided, and programs for causing a processor to execute processing of the constituent elements may be provided. Moreover, non-transitory computer readable recording media (non-transitory computer readable media) having recorded thereon the programs may be provided. It is apparent that such apparatuses, modules, methods, programs, and non-transitory computer readable recording media are also included in the present invention.

The whole or part of the example embodiments disclosed above can be described as, but not limited to, the following supplementary notes.

(Supplementary Note 1)

A method for determining passability comprising:
  detecting a passage obstacle obstructing passage of a moving body, based on image information obtained by imaging a target range for generating a movement path for the moving body;
  determining passability for the moving body through a passage area included in the target range, based on detection of the passage obstacle; and
  sending passability information related to the passability for the moving body, to a movement path generation apparatus generating the movement path.

(Supplementary Note 2)

The method for determining passability according to supplementary note 1, wherein
  the passage area includes a plurality of passages,
  the determining of passability for the moving body is determining passability for the moving body for each of the plurality of passages, based on detection of the passage obstacle, and the passability information includes information indicating the passability for the moving body for each of the plurality of passages.

(Supplementary Note 3)

The method for determining passability according to supplementary note 2, wherein the plurality of passages are located in respective paths obtained by branching at a predetermined branch point.

(Supplementary Note 4)

The method for determining passability according to supplementary note 2, wherein the plurality of passages are located in respective paths having identical movement directions.

(Supplementary Note 5)

The method for determining passability according to any one of supplementary notes 1 to 4, further comprising:

accumulating passable time period of the passage area, based on detection of the passage obstacle; and sending information related to accumulation of the passable time period, to the movement path generation apparatus.

(Supplementary Note 6)

The method for determining passability according to supplementary note 5, wherein the information related to the accumulation of the passable time period is an index value for evaluating a shortest possible movement path for the moving body.

(Supplementary Note 7)

The method for determining passability according to any one of supplementary notes 1 to 6, further comprising:

detecting a position of the moving body, based on the image information; and sending moving body position information related to the position of the moving body, to the movement path generation apparatus.

(Supplementary Note 8)

A passability determination apparatus comprising:

an obstacle detection section configured to detect a passage obstacle obstructing passage of a moving body, based on image information obtained by imaging a target range for generating a movement path for the moving body;

a determination section configured to determine passability for the moving body through a passage area included in the target range, based on detection of the passage obstacle; and a transmission processing section configured to send passability information related to the passability for the moving body, to a movement path generation apparatus generating the movement path.

(Supplementary Note 9)

The passability determination apparatus according to supplementary note 8, wherein the passage area includes a plurality of passages, the determination section is configured to determine passability for the moving body for each of the plurality of passages, based on detection of the passage obstacle, and the passability information includes information indicating the passability for the moving body for each of the plurality of passages.

(Supplementary Note 10)

The passability determination apparatus according to supplementary note 8 or 9, further comprising a time accumulation section configured to accumulate passable time period of the passage area, based on detection of the passage obstacle, wherein the transmission processing section is configured to further send information related to accumulation of the passable time period, to the movement path generation apparatus.

(Supplementary Note 11)

The passability determination apparatus according to any one of supplementary notes 8 to 10, further comprising a position detection section configured to detect a position of the moving body, based on the image information, wherein the transmission processing section further includes further sending moving body position information related to the position of the moving body, to the movement path generation apparatus.

(Supplementary Note 12)

A movement path generation system comprising:

an obstacle detection section configured to detect a passage obstacle obstructing passage of a moving body, based on image information obtained by imaging a target range for generating a movement path for the moving body;

a determination section configured to determine passability for the moving body through a passage area included in the target range, based on detection of the passage obstacle; and a movement path generation section configured to use passability information related to the passability for the moving body, to generate the movement path.

(Supplementary Note 13)

The movement path generation system according to supplementary note 12, wherein the passage area includes a plurality of passages, the determination section is configured to determine passability for the moving body for each of the plurality of passages, based on detection of the passage obstacle, and the passability information includes information indicating the passability for the moving body for each of the plurality of passages.

(Supplementary Note 14)

The movement path generation system according to supplementary note 13, wherein the movement path generation section is configured to select a path passable for the moving body from among the plurality of passages, based on the passability information, and generate a movement path including the selected path.

(Supplementary Note 15)

The movement path generation system according to any one of supplementary notes 12 to 14, further comprising a time accumulation section configured to accumulate passable time period of the passage area, based on detection of the passage obstacle, wherein the movement path generation section is configured to generate the movement path, based on information related to accumulation of the passable time period.

(Supplementary Note 16)

The movement path generation system according to any one of supplementary notes 12 to 15, further comprising a position detection section configured to detect a position of the moving body, based on the image information, wherein the movement path generation section is configured to generate the movement path, based on moving body position information related to the position of the moving body.

This application claims priority based on JP 2019-179042 filed on Sep. 30, 2019, the entire disclosure of which is incorporated herein.

INDUSTRIAL APPLICABILITY

By determining passability for a moving body through a passage area, based on detection of a passage obstacle, it is possible to appropriately determine whether or not the moving body can pass through a passage existing in a target range.

REFERENCE SIGNS LIST

1 Movement Path Generation System
100, 101, 102 Passability Determination Apparatus
151 Obtaining Section
153, 171 Obstacle Detection Section
155, 173 Determination Section
157, 175 Transmission Processing Section
159 Time Accumulation Section
161 Position Detection Section
200 Movement Path Generation Apparatus
241 Reception Processing Section
243 Path Generation Section
245 Transmission Processing Section
3 Network
300, 310, 320 Imaging Apparatus
4 Moving Body Control Apparatus
50, 51, 52 Moving Body

What is claimed is:

1. A method for determining passableness of a moving body, performed by a computer and comprising:
   detecting a passage obstacle obstructing passage of the moving body, based on image information obtained by imaging a target range for generating a movement path for the moving body through the passage area;
   determining the passableness of the moving body through a passage area included in the target range, based on detection of the passage obstacle;
   counting a number of times that a passage of the passage area has been determined as being impassable;
   generating the movement path based on passableness information related to the passableness of the moving body and the number of times that the passage has been determined as being impassable; and
   causing the moving body to move along the movement path such that the moving body passes through the passage area.

2. The method according to claim 1, wherein
   the passage is one of a plurality of passages of the passage area,
   determining the passableness of the moving body comprises determining the passableness for the moving body for each of the plurality of passages, based on detection of the passage obstacle, and
   the passableness information includes information indicating the passableness for the moving body for each of the plurality of passages.

3. The method according to claim 2, wherein the plurality of passages are located in respective paths obtained by branching at a predetermined branch point.

4. The method according to claim 2, wherein the plurality of passages are located in respective paths having identical movement directions.

5. The method according to claim 1, wherein the number of times that the passage has been determined as being impassable is an index value for evaluating a shortest possible movement path for the moving body through the passage area.

6. The method according to claim 1, further comprising:
   detecting a position of the moving body, based on the image information; and
   generating the movement path based further on moving body position information related to the position of the moving body.

7. A movement path generation system comprising one or more apparatuses that each include a memory storing instructions and one or more processors configured to execute the instructions such that the one or more apparatus are configured to:
   detect a passage obstacle obstructing passage of the moving body, based on image information obtained by imaging a target range for generating a movement path for the moving body through the passage area;
   determine the passableness of the moving body through a passage area included in the target range, based on detection of the passage obstacle;
   count a number of times that a passage of the passage area has been determined as being impassable;
   generate the movement path based on passableness information related to the passableness of the moving body and the number of times that the passage has been determined as being impassable; and
   cause the moving body to move along the movement path such that the moving body passes through the passage area.

8. The movement path generation system according to claim 7, wherein
   the passage is one of a plurality of passages of the passage area,
   the one or more apparatuses are configured to determine passableness for the moving body for each of the plurality of passages, based on detection of the passage obstacle, and
   the passableness information includes information indicating the passableness for the moving body for each of the plurality of passages.

9. The movement path generation system according to claim 8, wherein the one or more apparatuses are configured to further select a path passable for the moving body from among the plurality of passages, based on the passableness information, and generate the movement path to include the selected path.

10. The movement path generation system according to claim 7, wherein the one or more apparatuses are further configured to:
    detect a position of the moving body, based on the image information; and
    generate the movement path based further on moving body position information related to the position of the moving body.

11. The method for determining passableness according to claim 1,
    wherein the image information is obtained, without using a network, from one or more imaging apparatuses that are installed at one or more positions where the one or more imaging apparatuses look down upon the moving body and the target range, and wherein the passableness information is sent to the moving body via the network.

12. The movement path generation system according to claim 7,
wherein the image information is obtained, without using a network, from one or more imaging apparatuses that are installed at one or more positions where the one or more imaging apparatuses look down upon the moving body and the target range, and
wherein the passableness information is sent to the moving body via the network.

* * * * *